(12) United States Patent
Borst et al.

(10) Patent No.: US 8,444,401 B2
(45) Date of Patent: May 21, 2013

(54) CHECK VALVE AND PISTON PUMP HAVING CHECK VALVE

(75) Inventors: Peter Borst, Unlingen (DE); Markus Engel, Neufra (DE)

(73) Assignee: Rolf Prettl, Tuebingen (DE)

( * ) Notice: Subject to any disclaimer, the term of this patent is extended or adjusted under 35 U.S.C. 154(b) by 141 days.

(21) Appl. No.: 12/835,484

(22) Filed: Jul. 13, 2010

(65) Prior Publication Data
US 2010/0329911 A1 Dec. 30, 2010

Related U.S. Application Data

(63) Continuation of application No. PCT/EP2009/000163, filed on Jan. 14, 2009.

(30) Foreign Application Priority Data

Jan. 21, 2008 (DE) .......................... 10 2008 006 686

(51) Int. Cl.
*F04B 39/10* (2006.01)

(52) U.S. Cl.
USPC .............................. 417/559; 417/545; 137/511

(58) Field of Classification Search
USPC .................................. 137/511; 417/545, 559
See application file for complete search history.

(56) References Cited

U.S. PATENT DOCUMENTS

| | | | |
|---|---|---|---|
| 3,312,237 A | | 4/1967 | Mon et al. |
| 5,108,426 A | * | 4/1992 | Biro et al. ..................... 623/3.17 |
| 5,245,956 A | | 9/1993 | Martin |
| 5,415,531 A | * | 5/1995 | Cavanaugh .................... 417/397 |
| 5,518,026 A | * | 5/1996 | Benjey ...................... 137/512.15 |
| 6,253,788 B1 | | 7/2001 | Palvolgyi |
| 7,367,788 B2 | | 5/2008 | Kim |
| 2005/0063846 A1 | * | 3/2005 | Maeda .......................... 417/471 |
| 2007/0056648 A1 | | 3/2007 | Benjey |
| 2007/0157970 A1 | * | 7/2007 | Horng et al. ............. 137/512.15 |

FOREIGN PATENT DOCUMENTS

| | | |
|---|---|---|
| DE | 408499 | 1/1925 |
| DE | 1020060402502 | 3/2007 |
| FR | 2695965 | 3/1994 |

* cited by examiner

*Primary Examiner* — Charles Freay
*Assistant Examiner* — Patrick Hamo
(74) *Attorney, Agent, or Firm* — Casimir Jones SC (57) ABSTRACT

A check valve for arranging between a first pressure chamber, in which a first pressure prevails, and a second pressure chamber in which a second pressure prevails. The valve comprises a valve housing on which a valve seat is formed, and comprises a blocking element which is designed in a blocking position, to close a valve opening in the region of the valve seat, in order to block a connection between the first and the second valve chambers, and is designed in an open position to release the valve opening in order to release the connection between the first and the second valve chambers. The valve seat is configured as an oblique surface, which relative to the flow direction is aligned at an angle which is greater than 15° and less than 80°. The blocking element comprises a planar blocking lobe made from an elastically deformable material which in the blocking position bears against the oblique surface, and in the open position lifts away from the oblique surface in order to release the connection.

15 Claims, 7 Drawing Sheets

CHECK VALVE AND PISTON PUMP HAVING CHECK VALVE

CROSS-REFERENCE TO RELATED APPLICATIONS

This is a Continuation application of International patent application PCT/EP 2009/000163, filed Jan. 14, 2009, which claims the priority of German patent application DE 10 2008 006 686, filed Jan. 21, 2008.

BACKGROUND OF THE INVENTION

The present invention relates to a check valve for arranging between a first pressure chamber, in which a first pressure of a fluid prevails, and a second pressure chamber, in which a second pressure prevails, comprising a valve housing on which a valve seat is formed, and comprising a blocking element which is designed in a blocking position to close a valve opening in the region of the valve seat, in order to block a connection between the first and the second valve chambers when the second pressure is greater than the first pressure and is designed in an open position to release the valve opening in order to release the connection between the first and the second valve chambers when the first pressure is greater than the second pressure, the fluid being able to flow in the open position in a flow direction from the first pressure chamber into the second pressure chamber.

The present invention further relates to a fluid pump comprising a pump housing and a piston displaceably mounted therein which forms with the pump housing a pressure chamber, a suction connector of the pump being connected to the pressure chamber via a first check valve and the pressure chamber being connected to a pressure connector of the pump via a second check valve.

Such a check valve is generally known. A check valve is generally used for determining the direction of the flow of a fluid and is a directional control valve which automatically blocks the passage of fluid in one of the two flow directions.

So-called ball check valves are known, in particular, in which the blocking element is formed by a ball, which is pressed by a spring into the valve seat.

In an alternative embodiment, the valve seat is arranged perpendicular to the flow direction and closed by a flap. The flap may in this case be suspended on an upper region, in particular, so that it automatically reaches the blocking position due to its own weight.

A drawback with such check valves is, on the one hand, the large number of components. On the other hand, in particular with a check valve comprising a flap, the fluid flow in the open position is interrupted by the flap which is initially aligned approximately perpendicular to the flow direction. This leads to a relatively low degree of efficiency. Moreover, the frequencies which may be achieved when rapidly changing from the blocking position into the open position and vice versa are relatively low.

Piston pumps are pumps for conveying fluids, in a first stroke the fluid to be conveyed being suctioned in through an inlet valve by the piston. Subsequently, in a second stroke the fluid is ejected through the outlet valve. Such a pump may also be denoted as a displacement pump.

Due to the high pressures which are achievable, it is not excluded that fluid escapes between the pump and the pump housing. This may be undesirable in closed circuits. Moreover, it may also be undesirable if the fluid has the tendency to crystallize or to form clumps when at a standstill. This applies, for example, when using the fluid pump for pumping urea. Such pumps are used in urea injection systems, as are used in systems for cleaning the exhaust gas of vehicles operated by diesel engines (so-called DNOX systems).

BRIEF SUMMARY OF THE INVENTION

In view of the above background, it is the object of the invention to provide an improved check valve and an improved piston pump.

The above object is achieved according to a first aspect of the invention in the check valve mentioned in the introduction, in that the valve seat is configured as an oblique surface which is aligned relative to the flow direction at an angle which is greater than 15° and less than 80°, the blocking element comprising a planar blocking lobe made from an elastically deformable material which in the blocking position bears against the oblique surface and in the open position, due to the difference between the first pressure and the second pressure, lifts away from the oblique surface in order to release the connection.

The invention may also be simply worded as a check valve with an oblique valve seat, against which a blocking lobe made of elastically deformable material bears.

By the measure of configuring the valve seat as an oblique surface, the fluid may flow in the open position unhindered and/or in terms of flow technology more easily into the second pressure chamber. With the transfer from the blocking position into the open position, the fluid forces the planar blocking lobe away from the valve seat and may flow along the blocking lobe thus deflected into the second pressure chamber, without the fluid being considerably deflected thereby relative to the flow direction, as for example is the case in conventional flap check valves. Additionally, few components are required for the check valve according to the invention. Preferably, the valve only consists of the valve housing and the blocking element.

The valve opening may contain a plurality of individual openings, which are jointly closed by a blocking element. Preferably, the valve openings are arranged relative to one another so that they are aligned in the same manner in the radial direction, so that the fluid from the individual openings reaches the blocking lobe at the same "height".

Due to the design of the blocking lobe from an elastically deformable material it may be achieved that the blocking lobe is pretensioned in the blocking position due to the inherent elasticity. As a result, the blocking position may generally also be reliably reached.

The function of the check valve according to the invention is similar to the function of the gills of a fish which are also optimized in terms of flow technology due to evolution. Even with relatively high actuating frequencies of the check valve, in this case there is no tendency toward flapping.

The above object is, therefore, perfectly achieved according to the first aspect of the invention.

The check valve according to the invention is suitable for relatively high actuating limits, for example for actuating frequencies up to 60 or 70 Hz.

It is particularly advantageous if the angle of the oblique surface is greater than 30°.

As a result, the valve may be optimized even further in terms of flow technology.

The same also applies to the preferred case where the angle of the oblique surface is less than 60°.

According to a further preferred embodiment, the blocking element viewed in the flow direction is secured at a rear region of the oblique surface to the valve housing.

In this manner it is ensured that the blocking lobe is aligned obliquely to the front relative to the fastening region, i.e. already approximately in the flow direction.

It is also advantageous if the valve seat has two oblique surfaces, which are inclined in opposing directions and in longitudinal section form a V-shape, a blocking lobe being associated with each oblique surface.

As a result, with a relatively small amount of constructional space, a high throughflow volume may be achieved. The valve, as a result, contains two parallel check valves. In this manner, the radial forces which occur may also be compensated relative to one another. Thus this configuration is preferably also suitable for when the check valve is part of a system which is movable in the flow direction, for example arranged on a piston.

Thus it is particularly advantageous if the two blocking lobes are integrally connected together.

As a result, the number of components may be kept low.

Overall, it is also advantageous if the blocking element has a fastening portion, by means of which the blocking element is fastened to the valve housing.

The fastening to the valve housing may thus take place by means of screws, by bonding or by other types of fastening.

It is particularly advantageous, however, if the valve housing has a fastening recess which is aligned transversely to the flow direction, the fastening portion being inserted into the fastening recess in order to secure the blocking element in the flow direction positively to the valve housing.

In this manner, the blocking element may be fastened to the valve housing without further components or materials. It is thus conceivable that the blocking element has a bead extending transversely to the flow direction which is inserted into a corresponding recess of the valve housing extending transversely, in order to achieve a positive axial connection.

It is, however, particularly advantageous if the fastening portion comprises an annular portion which is inserted into an annular fastening recess of the valve housing.

In this embodiment, it is particularly advantageous if without further measures the blocking element may be also fixed in the radial direction to the valve housing. This may be particularly advantageous if the valve is arranged on a movable element such as a piston.

It is further advantageous in this connection if the annular portion is connected to the blocking lobe via at least one longitudinal web portion.

This permits a one-piece design of the blocking element, the longitudinal web portion connecting the annular portion and the blocking lobe (or the two blocking lobes) together.

It is also advantageous if the longitudinal web portion is arranged in a longitudinally aligned recess of the valve housing.

As a result, the fastening portion of the blocking element, for example, may be integrated in a cylindrical contour of the valve housing, without the fastening portion protruding outwardly in the radial direction relative to the cylindrical contour. In particular, therefore, this design is suitable for the use of the check valve on a movable element.

Thus it is particularly advantageous if two blocking lobes are connected to one another on a transverse web (for example V-shaped) the ends thereof in each case being connected to the annular portion via a longitudinal web portion.

This embodiment permits a connection which is stable in the axial direction between the blocking lobe and the annular portion.

Overall, it is further preferred if the valve housing has a cylindrical portion which has at least one longitudinal channel connected to the valve opening, the valve seat being configured on a front face of the cylindrical portion, in particular at the front when viewed in the flow direction.

This embodiment permits, on the one hand, a simple housing structure. Thus the second pressure chamber may, for example, be formed by a cylindrical portion and a second housing portion. The longitudinal channel thus preferably forms part of the first pressure chamber. Moreover, it is advantageous in this case if the check valve may be integrated in a simple manner in a cylindrical piston and namely on the front face thereof.

According to a second aspect of the present invention, the above object is achieved by the fluid pump mentioned at the beginning, the suction connector being connected to a compensating chamber, into which fluid passes which escapes between the piston and the pump housing.

As a result, it is achieved that the fluid escaping between the piston and the pump housing initially passes into the compensating chamber and then in a following suction stroke via the suction connector is moved back again into the regular fluid path from the suction connector into the pressure chamber. As a result, the fluid received initially in the compensating chamber does not remain in this compensating chamber but is immediately circulated again.

Thus the fluid pump according to the invention is suitable for such fluids, in particular, which tend to crystallize or to form clumps when at a standstill. In particular, the fluid pump according to the invention is consequently suitable as a urea pump, for example for a urea injection system for cleaning the exhaust gas of diesel engines.

The above object is also perfectly achieved, therefore, according to the second aspect of the present invention.

According to a preferred embodiment, therefore, a piston rod of the piston is guided in the region of the compensating chamber through a piston rod opening from the pump housing.

Overall, this permits a compact construction and a simple integration of the compensating chamber in the pump housing. Moreover, the compensating chamber may thus be arranged, in particular, concentrically to the piston rod so that a simple construction results.

It is particularly preferred, therefore, if an outer face of the piston is sealed relative to the piston rod opening by means of a flexible sealing arrangement.

As a result, it may be ensured that the fluid entering the compensating chamber may not escape from the pump housing. In other words, as a result, a closed circuit may be achieved via which the fluid escaping between the piston and the pump housing is again passed back to the suction connector.

It is particularly advantageous if the sealing arrangement has a membrane portion.

Such a membrane portion may generally be of resilient configuration and due to this resilience may assist the pump action of the pump and/or generate its own pump action. Thus the sealing arrangement is driven along by axial movements of the piston, so that consequently alterations to the volume of the compensating chamber may result.

This may be advantageous, in particular, if a gaseous fluid is used as a fluid.

Moreover, this pump action may be achieved in a particularly advantageous manner when the membrane portion extends in the radial direction between an outer circumference of the piston and an inner periphery of the compensating chamber. This additionally permits a simple construction of the flexible sealing arrangement.

According to a further embodiment, the flexible sealing arrangement has a bellows portion which extends around the piston rod.

Such a bellows portion may also absorb the axial movements of the piston, and namely in the axial direction. Additionally, the seal of the sealing arrangement may be implemented structurally in a simple manner relative to the piston rod opening, due to the axial alignment.

Generally, the use of a bellows portion is preferred if the fluid is not compressible or only slightly compressible, such as for example a liquid (in particular urea). In this case, by the axially aligned bellows contour it may be achieved that the volume of the compensating chamber only alters slightly with axial movements of the piston. In this connection, an additional and/or separate pump action via the compensating chamber may be undesirable, as the low-compressible fluid may considerably load the sealing arrangement.

It is, therefore, particularly advantageous if the bellows portion has a neutral cylindrical contour, the circumference thereof corresponding to the outer circumference of the piston portion, which extends into the compensating chamber.

Due to the neutral cylindrical contour, it may be achieved that the volume of the compensating chamber does not alter at all or only alters slightly with piston movements. As a result, it may be achieved that the sealing arrangement is only loaded to a small degree, in particular when a low-compressible fluid is used.

According to a further preferred embodiment, the piston is sealed relative to the pump housing by means of an annular sealing element, which has an axial annular recess which is open toward the pressure side, and via which the pressurized fluid may press an annular sealing lip inwardly in the radial direction.

This embodiment is viewed as an invention in its own right, independently of the embodiment of a compensating chamber.

In this connection, it is advantageous if the sealing action may be increased by simple structural means between the piston and the pump housing. Moreover, by this measure it may be achieved that a radially internal wear of the sealing lip (which may bear radially inwardly against the movable piston) is compensated over the life of the fluid pump.

Overall, it is moreover advantageous if the pump housing has a main housing on which the piston is displaceably mounted, a cover on the pressure side and a cover on the suction side, the covers being connected to the main housing on axially opposing ends.

In this manner, the pump housing may be produced in a manner which is simple and compact structurally. Additionally, the axially opposing covers may undertake further functions in addition to the configuration of the pressure chamber, on the one hand, and the compensating chamber, on the other hand. In addition, a simple assembly results.

Thus it is particularly advantageous if the second check valve is secured to the cover on the pressure side.

As in this manner the second check valve may be preassembled on the cover on the pressure side, a simple assembly results.

It is advantageous, moreover, if the main housing has an axial recess which is closed by means of the cover on the suction side.

The axial recess may be used in this manner for implementing different functions, as disclosed below.

Thus it is particularly advantageous if the axial recess contains the compensating chamber.

As a result, the compensating chamber may be produced in a structurally simple manner.

Moreover, it is advantageous if an annular insert is received in the axial recess.

Such an annular insert may also fulfill various functions, in particular sealing tasks on axially opposing ends of the axial recess.

Thus, it is particularly advantageous if the annular insert secures an annular sealing element for sealing the piston relative to the pump housing in the axial direction against a base of the axial recess.

In this manner, the annular sealing element may be mounted and secured in a structurally simple manner in the pump housing.

It is also advantageous if the annular insert is secured in the axial recess by means of the cover on the suction side.

For example, axial forces acting on the annular sealing element may be absorbed via the annular insert by the cover on the suction side.

It is further preferred if a sealing arrangement is secured between the annular insert and the cover on the suction side.

This firstly permits a seal of the pump housing. Secondly, the sealing arrangement may be part of the flexible sealing arrangement which is provided for sealing the piston relative to the piston rod opening, the piston rod opening in this case preferably being configured in the cover on the suction side.

As a result, the number of components may be further reduced.

According to a further preferred embodiment, the first check valve is secured to the piston.

As a result, the entire construction of the fluid pump may be simplified. The check valve may thus preferably be arranged on a front face of the piston. This may be a front face on the suction side, but preferably the front face on the pressure side.

According to a further preferred embodiment, a third check valve is arranged in the region of the suction connector.

As a result, it may be achieved that fluid may not flow back from the compensating chamber in the direction of a fluid reservoir. The efficiency of the fluid pump may be further increased, as a result.

Overall, it is also advantageous if the first and/or the second and/or the third check valve is configured as a check valve according to the first feature of the present invention.

A further advantageous embodiment of the fluid pump is to connect the piston rod opening to a consumer for pressurized gas.

The volume divided off from the compensating chamber by the flexible sealing arrangement and connected to the piston rod opening alters with axial movements of the piston. As a result, as a secondary effect of the piston movement air may be ejected from the piston rod opening.

This air may be supplied to a consumer for pressurized gases, such as for example air.

It is particularly advantageous, therefore, if the piston rod opening is connected to a gas supply channel, which surrounds at least one portion of the piston rod protruding from the pump housing.

The piston rod may, as a result, be guided in the manner of air suspension so that the frictional effect which occurs is minimized.

The air suspension thus forms a "gas consumer" in the above mentioned sense.

Generally, it is also conceivable to utilize said pump action on the volume connected to the piston rod opening by additional use of at least one, preferably two, check valves to suction fresh gas (fresh air) continuously and to discharge said gas to a different location (after use of the gas for air suspension or another consumer).

The fluid pump may additionally be configured, as a whole, substantially or completely without metal. The pump housing may consist of plastics. The same applies to the annular insert and the annular sealing element.

Also, the piston may be configured from plastics and the blocking element which is associated with each of the check valves may also be configured from a resilient plastics material.

It is understood that the aforementioned features and the features to be described below in further detail may be used not only in the respective combination provided but also in other combinations or separately, without departing from the scope of the present invention.

BRIEF DESCRIPTION OF THE SEVERAL VIEWS OF THE DRAWING

Exemplary embodiments of the invention are shown in the drawings and are explained in more detail in the following description, in which.

DETAILED DESCRIPTION OF THE INVENTION

Figure 1:
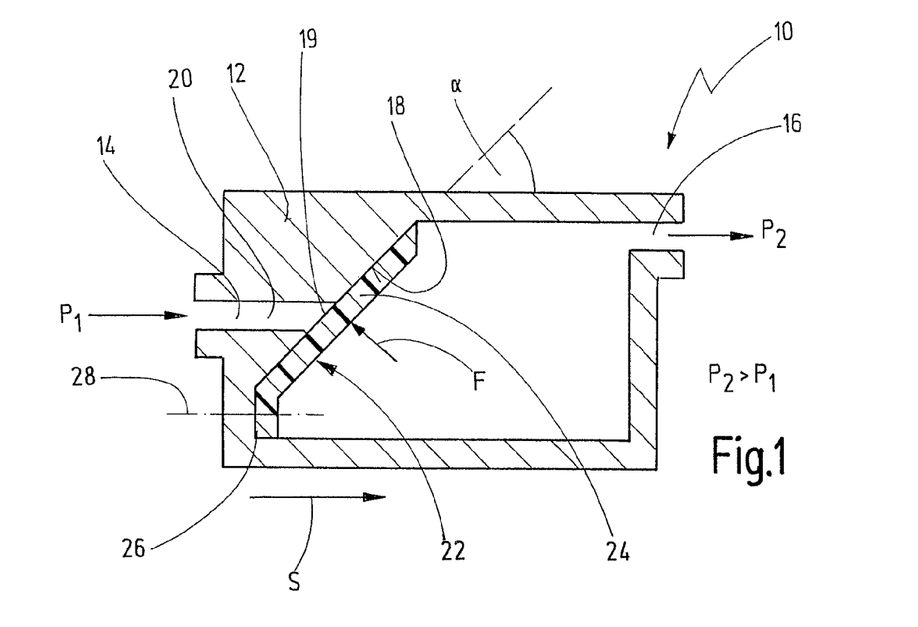
FIG. 1 shows a schematic longitudinal sectional view through a first embodiment of a check valve according to the invention in a blocking position.

In FIG. 1 a first embodiment of a check valve according to the invention is denoted by 10. The check valve 10 has a valve housing 12. The valve housing separates a first pressure chamber 14 in which a fluid has a first fluid pressure $P_1$, from a second pressure chamber 16, in which the fluid has a second pressure $P_2$.

In the inside of the valve housing 12 a valve chamber is formed which is connected to the second pressure chamber 16.

The check valve sets a flow direction S via which fluid may pass from the first pressure chamber 14 into the second pressure chamber 16. The flow direction S is parallel to a longitudinal extension of the check valve 10.

One side of the valve chamber facing the first pressure chamber 14 is configured as a valve seat 18. The valve seat 18 is thus formed as an oblique surface, which relative to the flow direction S encompasses an angle which is greater than 15° and less than 80°, in particular greater than 30° and less than 60°, in the present case 45°.

On the valve seat 18 a valve opening 19 is formed, said valve opening being connected via a longitudinal channel 20 in the valve housing 12 to the first pressure chamber 14. The valve opening 19 may be a separate valve opening or consist of a plurality of separate individual openings, which are connected to the first pressure chamber 14.

The oblique surface of the valve seat 18 may be configured as a planar surface, as shown in FIG. 1. The oblique surface may, however, also be configured as a bulged surface, which for example is shaped in longitudinal section and/or in cross section as concave or convex.

Moreover, a blocking element 22 of the check valve 10 is arranged in the valve chamber. The blocking element 22 is produced from a resiliently deformable material, in particular a plastics material and has a blocking lobe 24. The blocking lobe 24 is adapted with regard to its shape to the valve seat 18, i.e. in the present case is configured as a planar lobe (but may be a bulged lobe).

The blocking element 22 further comprises a fastening portion 26 configured integrally with the blocking lobe 24. The fastening portion 26 is secured in a rear region of the valve seat 18 viewed in the flow direction S to the valve housing 12. Fastening means 28 used to this end are shown schematically in FIG. 1. The fastening means may, for example, be formed by one or more screws, rivets or the like. The fastening means 28 may, however, also be formed by bonding. Alternatively, it is also possible to form the fastening portion 26 integrally with the valve housing 12 in a two-component method.

The blocking element 22 is, as mentioned, formed from a resilient material and is attached via the fastening portion 26 to the valve housing 12 such that a blocking lobe 24 in a relaxed position (i.e. not elastically deflected) bears against the valve seat 18. Alternatively, it is also possible to configure the blocking element so that the blocking lobe 24 bears against the valve seat 18 with a specific pretensioning in the direction opposing the flow direction S.

In FIG. 1, the check valve 10 is shown in a blocking position, in which the second pressure $P_2$ is greater than the first pressure $P_1$. As a result, the blocking lobe 24 is pressed against the valve seat 18. The valve opening 19 is closed, as a result.

It is understood that in the above discussion of the pressures, the inherent pressure applied by the blocking element 22 counter to the flow direction S may optionally also be considered.

Figure 2:
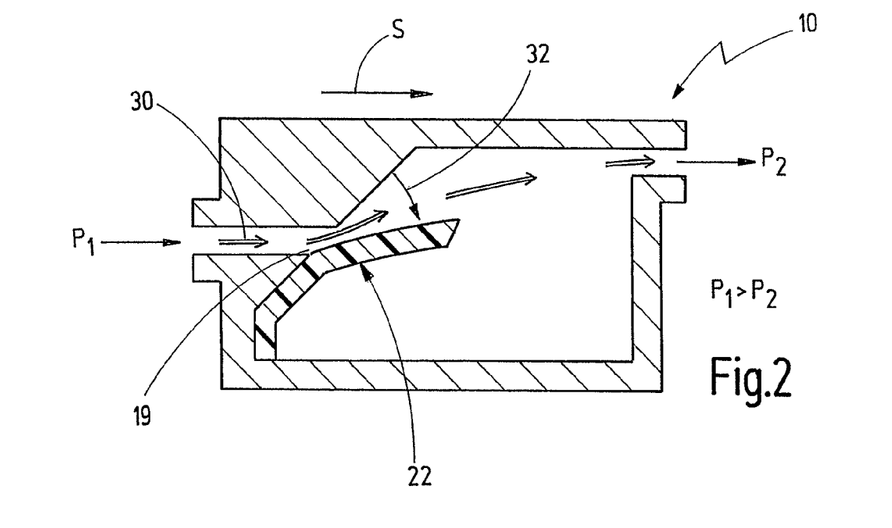
FIG. 2 shows the check valve of FIG. 1 in an open position.

In FIG. 2, the check valve 10 is shown in an open position. In this connection, the first pressure $P_1$ is greater than the second pressure $P_2$ (again the possible pretensioning force of the blocking lobe 24 may be included). Due to the greater pressure $P_1$, a fluid located in the first pressure chamber 14 forces the blocking lobe 24 away from the valve seat 18 and deflects said valve seat, as shown schematically at 32. As a result, the fluid 30 as shown by the double arrows may flow from the first fluid chamber 14 into the second fluid chamber 16. At the same time, the fluid 30 does not reach the side of the blocking lobe 24 facing the first pressure chamber 14 front-on but obliquely, so that in terms of flow technology it may be advantageously forwarded from the first fluid chamber 14 into the second fluid chamber 16. In particular, only a small amount of turbulence and other disadvantageous phenomena in terms of flow technology result. In other words, the flow moves obliquely and/or laterally against the blocking lobe 24, similar to the gills of a fish.

As a whole, a high actuating frequency may be achieved by the check valve, for example greater than 50 Hz, without flutter of the blocking element occurring. The shape of the blocking lobe 24 may also be selected so that with a pressure reversal for introducing a suction stroke the blocking lobe is forced back in the direction against the valve seat 18 (for example by suitable shaping of a front end of the blocking lobe, as indicated schematically in FIG. 2.

Further alternative embodiments of check valves according to the invention are explained hereinafter. Said embodiments correspond with regard to the general construction and the general mode of operation to the above-described check valve 10 of FIGS. 1 and 2. Hereinafter, only the differences are described.

Figure 3:
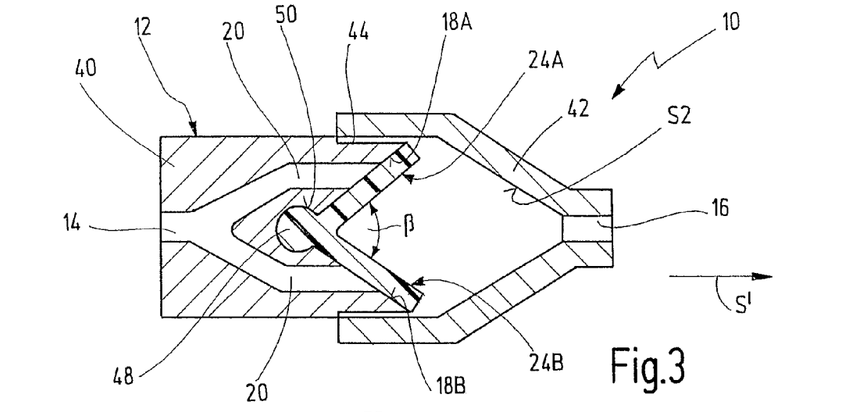
FIG. 3 shows a further embodiment of a check valve according to the invention in schematic longitudinal section.

FIG. 3 shows an alternative embodiment of a check valve, which comprises a valve housing 12 with a first partial housing 40 and a second partial housing 42, which, for example, are connected together by a threaded engagement 44 or the like.

Moreover, the check valve 10 of FIG. 3 comprises a blocking element 22, which contains two blocking lobes 24A, 24B, which are preferably integrally connected together. The blocking lobes 24A, 24B bear against corresponding valve seats 18A, 18B of the first partial housing 40, which are inclined relative to the flow direction S in the opposing direction. Accordingly, the valve seats 18A, 18B and/or the blocking lobes 24A, 24B are arranged in a V-shape, and enclose an angle β which is preferably greater than 40° and less than 150°.

A separate longitudinal channel 20 is associated with each of the valve seats 18A, 18B, the longitudinal channels 20 in each case being connected to the first pressure chamber 14. In FIG. 3, two longitudinal channels 20 are shown, i.e. one longitudinal channel 20 for each blocking lobe 24. However, a plurality of longitudinal channels 20 (and corresponding valve openings) may also be provided for each blocking lobe 24.

Moreover, the two blocking lobes 24A, 24B are connected integrally with one another, namely via a transverse web 48. In the embodiment shown, the transverse web 48 is of beadlike configuration in longitudinal section and in the transverse direction (perpendicular to the drawing plane) is inserted into a fastening recess 50 of the first partial housing 40. As a result, the blocking element 22 may be positively connected without further fastening means to the first partial housing 40 in the flow direction S.

In this embodiment, the valve chamber connected to the second pressure chamber 16 is formed between the first and second partial housing 40, 42. The second valve housing 42 may thus have a conical surface 52 which tapers in the flow direction, towards the second pressure chamber 16. As a result, the flow of fluid 30 in the open position may be even further optimized from the point of view of flow technology.

Figure 4:
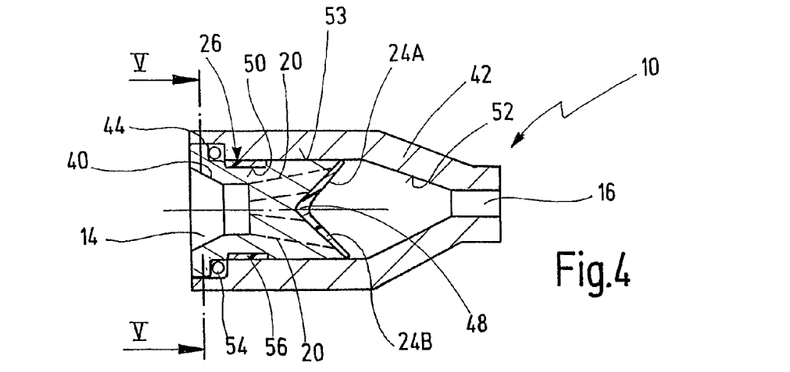
FIG. 4 shows a longitudinal sectional view of a further embodiment of a check valve according to the invention.

FIG. 4 shows a further embodiment of a check valve according to the invention which generally corresponds as regards construction and function to the check valve of FIG. 3.

It may be seen that the first partial housing 40 has a cylindrical portion 53 to which the blocking element 22 is secured. Moreover, the first partial housing 40 and the second partial housing 42 are connected together via a seal 54.

Moreover, the check valve of FIG. 4 differs from that of FIG. 3 by the type of configuration of the fastening portion 26. Whilst in the embodiment of FIG. 3 the fastening portion is formed by a transverse web having a bead shape, in the embodiment of FIG. 4 a fastening portion 26 is provided which comprises an annular portion 56. The annular portion 56 is received in an annular fastening recess 50 surrounding the cylindrical portion 53, so that the annular portion 56 in the radial direction does not protrude relative to the outer contour of the cylindrical portion 53. The annular portion 56 is connected to the integrally connected blocking lobes 24A, 24B via longitudinal web portions, which are described below.

Figure 5:
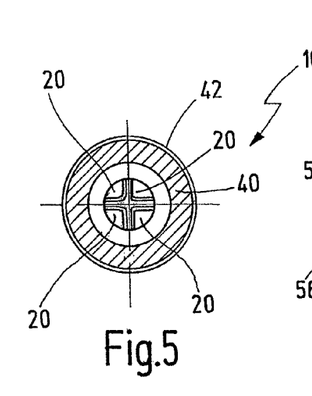
FIG. 5 shows a sectional view along the line V-V in FIG. 4.

In FIG. 5, it may be seen that on the first partial housing 40 four longitudinal channels 20 are formed, in each case two longitudinal channels being associated with one blocking lobe 24A, 24B.

Figures 6, 7:
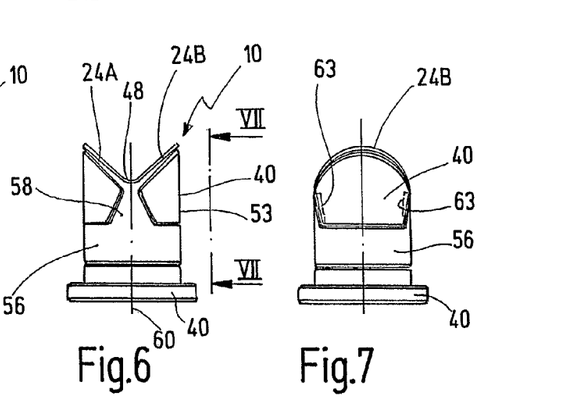
FIG. 6 shows a side view of an internal part of the check valve of FIG. 4.
FIG. 7 shows a further side view of the part of the check valve of FIG. 4 in a position rotated by 90° relative to the position of FIG. 6.

In FIG. 6 it may be seen that the annular portion 56 is connected in each case on radially opposing sides via a longitudinal web portion 58 to one respective end of the transverse web 48, which connects the blocking lobes 24A, 24B together. The longitudinal web portions 58 are preferably received on the first partial housing 40 so that they do not protrude relative to the outer contour of the cylindrical portion 53.

To this end, radial recesses are provided on the outer periphery of the first partial housing 40, as shown in FIG. 7 at 63.

Figure 8:
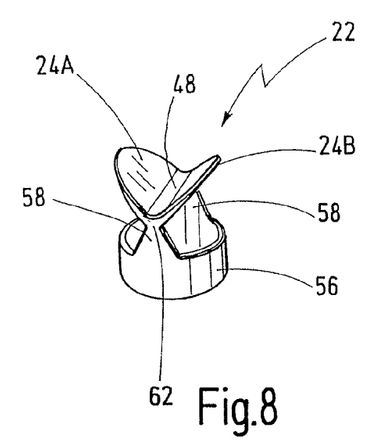
FIG. 8 shows a blocking element used in the check valve of FIGS. 4 to 7 in a perspective view.
Figure 9:
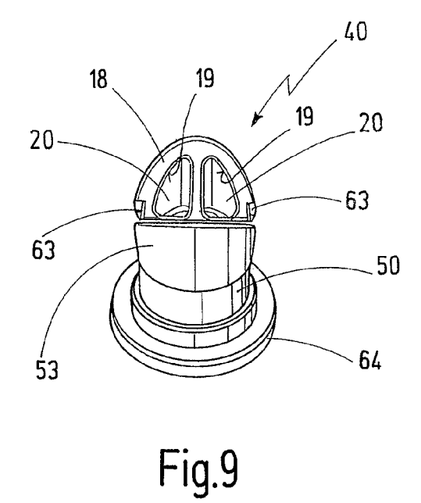
FIG. 9 shows a partial housing of the valve housing used in the check valve of FIGS. 4 to 7 in a perspective view.

In FIGS. 8 and 9 the blocking element 22 and the first partial housing 40 are shown separately in each case, in order to indicate the above described functions. It is also visible in FIG. 9 that the first partial housing at its rear end has a flange portion 64 protruding radially relative to the cylindrical portion 53, by means of which the first partial housing 40 is connected to the second partial housing 42 and may be sealed relative thereto, as may be seen in FIG. 4.

The above-described embodiments of check valves may all be used as fixed, immobile check valves in any application. Both liquid and gaseous materials may be considered as fluid. Due to the cylindrical shape of the first partial housing 40, the first partial housing 40, however, may also be configured as a piston, i.e. as a mobile element, which is sealed relative to a second fixed housing. In this embodiment, the check valve according to the invention may be used, in particular, in a piston pump.

Figure 10:
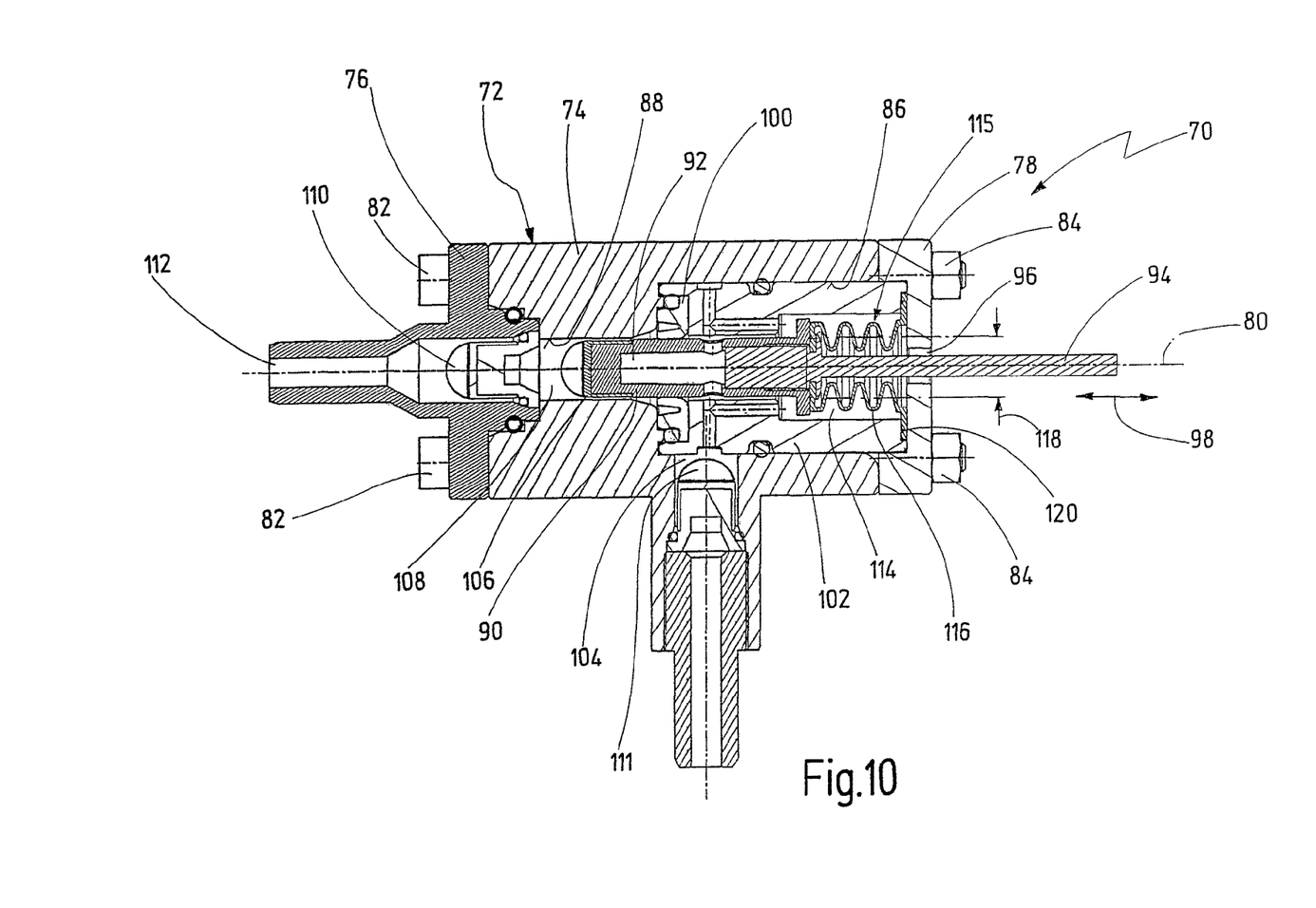
FIG. 10 shows a longitudinal sectional view through a fluid pump according to an embodiment of the present invention.

A preferred embodiment of a piston pump according to the invention is denoted in FIG. 10 by 70.

The piston pump configured as a fluid pump 70 has a pump housing 72. The pump housing 72 contains a main housing 74 as well as a cover 76 on the pressure side, and a cover 78 on the suction side, which are attached at axially opposing ends to the main housing 74. A longitudinal axis of the pump housing 72 is shown at 80.

For connecting the housing parts 74, 76, 78 continuous connecting bolts 82 are provided, the housing parts 74, 76, 78 being axially secured to one another in the axial direction by corresponding nuts 84. In the case shown, the pump housing 72 has four connecting bolts 82 and associated nuts 84 of which in FIG. 10 only two are shown.

In the region of the cover 78 on the suction side the main housing 74 has an axial recess 86. The axial recess 86 is connected continuously via a piston guide 88 to the opposing end of the main housing 74. In the piston guide 88 a piston 90 is displaceably guided in the longitudinal direction.

The piston 90 has a longitudinal channel 92, which is open towards the suction side. Into this open end from the suction side a piston rod 94 is inserted, said piston rod being connected to the piston 90 via a suitable seal (not shown). In the cover 78 on the suction side an opening 96 is formed through which the piston rod 94 extends from the pump housing 72. At 98 an actuator is indicated in schematic form, by means of which the piston rod 94 may be moved with reciprocating action in the longitudinal direction.

An annular sealing element 100 is inserted into the axial recess 86. Said annular sealing element bears against a base of the axial recess 86, i.e. towards the pressure side. The annular sealing element 100 thus encloses the piston 90 and ensures a seal of the piston 90 relative to the pump housing 72. Into the axial recess 86 an annular insert 102 is further inserted, said annular insert bearing against the internal circumference of the axial recess 86, and extending in the axial direction from the cover 78 on the suction side as far as the annular sealing element 100. The annular sealing element 100 is, as a result, secured in the axial direction between the base of the axial recess 86 and the end of the annular insert 102 on the pressure side. The annular insert 102 is sealed relative to the main housing 74 by means of a seal, not denoted in more detail.

On the main housing 74 a suction connector 104 is formed and namely approximately in the middle thereof. The suction connector 104 is in this case radially aligned and opens into the axial recess 86. In the annular insert 102, transverse channels are formed via which the suction connector 104 is connected to the interior of the annular insert 102. Moreover, on the piston 90 at least one transverse recess is formed via which the inside of the annular insert 102 may be connected to the longitudinal channel 92. In this case, the longitudinal channel 92 is connected via suitable means such as the disclosed transverse channels to the suction connector 104.

At the end of the piston 90 on the pressure side, a first check valve 106 is formed. The check valve 106 is designed so that a fluid flow is possible in the direction of the pressure side, but a return flow is not possible. The first check valve 106 may thus be configured as one of the check valves 10 of FIGS. 1 to 9. The piston 90 forms in this case the valve housing 12 and/or the first partial housing 40.

A pressure chamber 108 is formed between the end of the piston 90 on the pressure side and the cover 76 on the pressure side.

On the cover 76 on the pressure side a continuous channel is formed which opens in a pressure connection. Between the pressure connection 112 and the pressure chamber 108 a second check valve 110 is arranged. This is preferably secured to the cover 76 on the pressure side. The second check valve 110 may also be configured as a check valve 10 according to one of FIGS. 1 to 9 and is arranged so that a flow from the pressure chamber 108 to the pressure connection 112 is possible, but a reverse fluid flow is prevented.

In the region of the suction connector 104, moreover, a third check valve 111 may be formed which also permits a flow from the inlet towards the suction connector 104 and as a result towards the longitudinal channel 92, but prevents a return flow. The third check valve 111 is optionally provided for improving the efficiency, but not necessarily required for the function.

In the axial recess 86, more specifically inside the annular insert 102, a compensating chamber 114 is also provided. The compensating chamber 114 serves for receiving fluid which, during an operating stroke, flows back from the pressure chamber 108 between the piston 90 and the annular sealing element 100 (due to the sealing action of the annular sealing element 100 which is not necessarily always 100% and/or due to the relatively high pressures inside the pressure chamber 108). This escaping fluid is then forced into the compensating chamber 114 via transverse and longitudinal channels in the annular insert 102. The compensating chamber 114 is further connected to the suction connector 104 via longitudinal and transverse channels in the annular insert 102. Accordingly, during an operating stroke fluid entering the compensating chamber 114 during a subsequent suction stroke may be suctioned from the compensating chamber 114 and fed into the regular flow path (via the longitudinal channel 92 into the pressure chamber 108).

For sealing the opening 96, a flexible sealing arrangement 115 is provided which seals the outside of the piston and/or the piston as a whole relative to the opening 96. As a result, it is prevented that fluid entering the compensating chamber 114 passes via the opening 96 to the outside. The sealing arrangement 115 is thus designed to absorb movements of the piston 90 relative to the pump housing 72. In the present case, the flexible sealing arrangement 115 has a bellows portion 116, which is arranged concentrically to the piston rod 94. One end of the bellows portion 116 is connected to a rear end of the piston 90. The other end is secured to an axial inner face of the cover 78 on the suction side, such that the interior of the bellows portion 116 is connected to the outside of the pump housing 72 (via the opening 96).

The bellows portion 116 has in this case a neutral cylindrical contour 118, in each case outer half-waves of the bellows contour extending outside the neutral cylindrical contour 118 and inner half-waves of the bellows contour extending inside the neutral cylindrical contour 118.

The circumference of the neutral cylindrical contour 118 is in this case tailored to the outer circumference of the piston 90, so that the volume of the compensating chamber 114 is not altered or only unsubstantially altered with axial movements of the piston 90. Accordingly, in particular when using a liquid fluid (such as for example urea), no substantial force is exerted on the bellows portion 116 and/or the sealing arrangement 115 via the compensating chamber 114. Accordingly, the sealing arrangement 115 may be configured very flexibly, without the risk that the arrangement is damaged or otherwise negatively influenced due to volume alterations.

Figure 11:
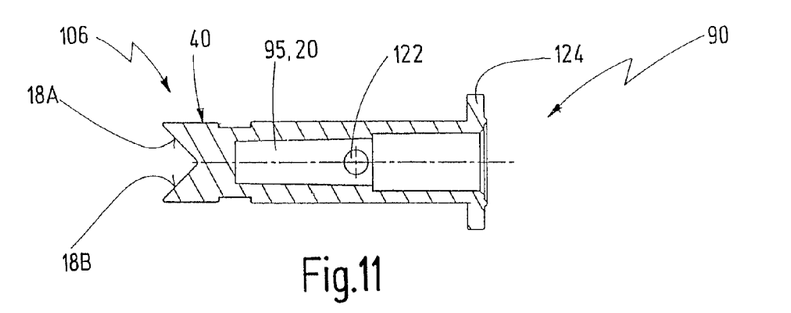
FIG. 11 shows a longitudinal sectional view through a piston of the fluid pump of FIG. 10.
Figure 12:
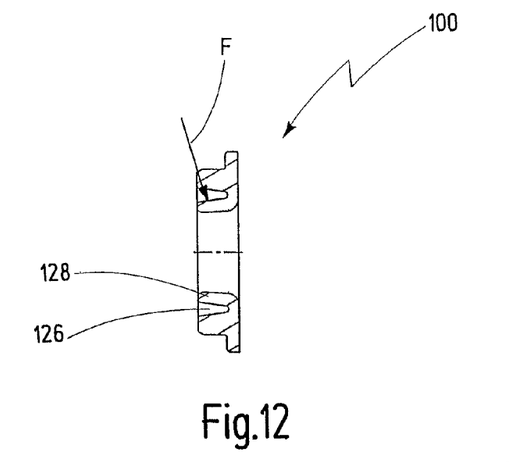
FIG. 12 shows a longitudinal sectional view through an annular element of the fluid pump of FIG. 10.
Figure 13:
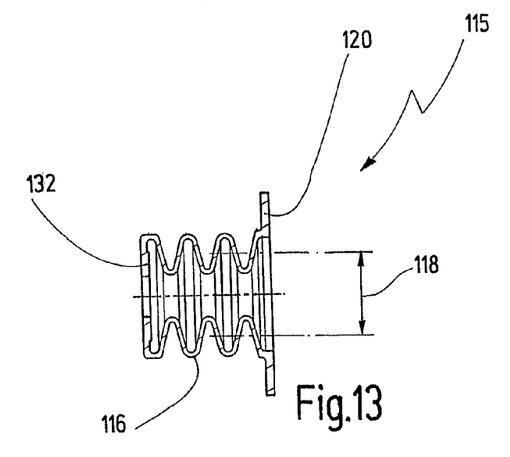
FIG. 13 shows a longitudinal sectional view through a sealing arrangement of the fluid pump of FIG. 10.

In FIGS. 11 to 13, individual parts of the fluid pump 70 are shown. Thus in FIG. 11 the piston 90 is shown and it may be seen that said piston at the front end comprises valve seats 18A, 18B (comparable with the valve seats of the embodiment of the check valve of FIG. 4). Moreover it may be seen that the longitudinal channel 92 substantially corresponds to the longitudinal channel 20 of the check valve of FIGS. 1 to 9. In FIG. 11 at 122 a transverse channel is further shown which connects the longitudinal channel 92 to the suction connector 104. At the end of the piston 90 on the suction side, a flange portion 124 is further formed. Said flange portion may firstly serve as a stop for the piston 90 relative to the pump housing 72 (and/or relative to the annular insert 102). Secondly the flange portion 124 serves to secure one end of the bellows portion 116 on the pressure side, and namely between the flange portion 124 and a corresponding flange portion of the piston rod 94.

In FIG. 12, the annular sealing element 100 is shown. The annular sealing element 100 has an axial annular recess 126 toward the pressure side such that on the outer circumference of the piston, not shown in FIG. 12, an annular sealing lip 128 bears which extends from the suction side to the pressure side.

Provided a high pressure prevails in the pressure chamber 108, so that fluid between the piston 90 and the piston guide 88 is forced towards the suction side, said pressure has the result that a radial force F is exerted on the annular sealing lip 128. As a result, the radial force F presses the annular sealing lip 128 in the radial direction against the outer circumference of the piston 90.

By this configuration of the annular sealing element 100, firstly an efficient sealing effect may be achieved. Secondly, wear on the inner periphery of the sealing lip 128 occurring over the service life may also be compensated.

In FIG. 13 the flexible sealing arrangement 115 is shown with the bellows portion 116.

In this case, the sealing flange 120 may be seen which is secured in the assembled state between the end on the suction side of the annular insert 102 and the inside of the cover 78 on the suction side. Moreover, in FIG. 13 a further axially opposing sealing flange 132 of the sealing arrangement 115 may be seen, the further sealing flange 132 being secured between the flange portion 124 of the piston 90 and a corresponding flange portion of the piston rod 94, in order to ensure appropriate sealing of the compensating chamber 114.

In FIGS. 14 to 17 the mode of operation of a fluid pump 70 according to the invention is shown which generally corresponds with regard to construction and mode of operation to the fluid pump 70 of FIG. 10.

Figure 14:
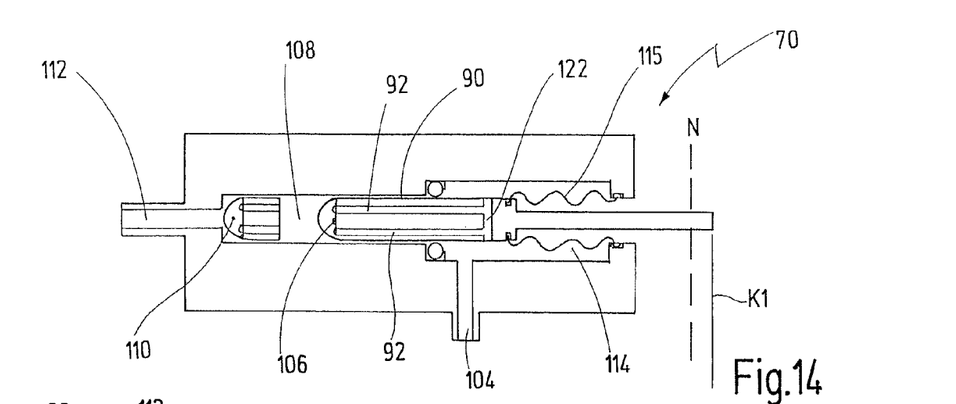
FIG. 14 shows a schematic view of the function of a fluid pump according to the invention in a position at the start of an operating stroke.

In this connection in FIG. 14, an end position of the piston 90 is shown, which is adopted at the start of an operating stroke. As a result, this piston position K1 is located in the axial direction behind a neutral position N. In this position, the sealing arrangement 115 in the axial direction is compressed to a maximum extent.

Figure 15:
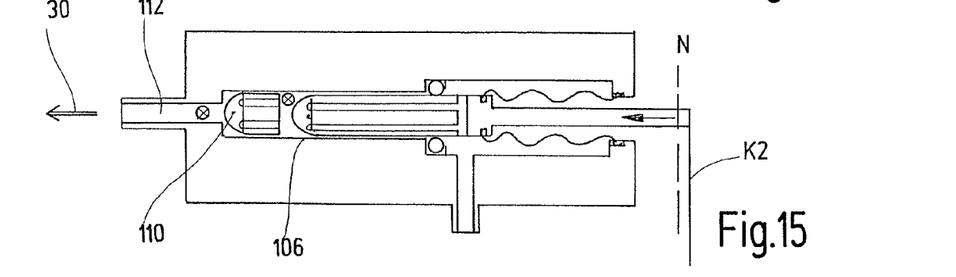
FIG. 15 shows a view comparable with FIG. 14 during an operating stroke.

In FIG. 15 it is shown that the piston is moved towards the pressure side (piston position K2). In this connection in the pressure chamber 108 a pressure is produced which is greater than the fluid pressure on the pressure connector 112, so that the fluid is ejected via the second check valve 110 to the pressure connector 112.

Figure 16:
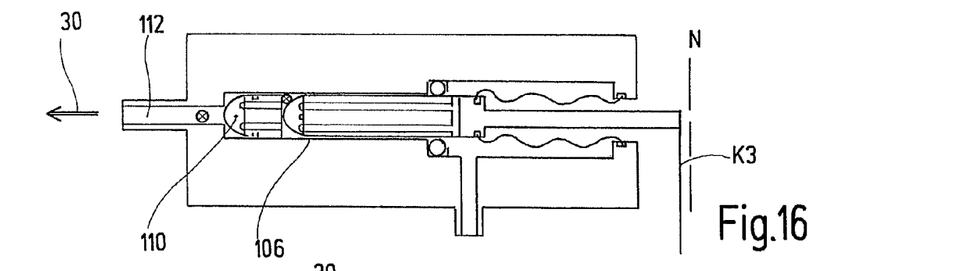
FIG. 16 shows a view comparable with FIG. 14 at the end of an operating stroke.

In FIG. 16 the end position of the operating stroke is shown (piston position K3) in which the fluid 30 has been discharged as far as possible from the pressure chamber 108 via the second check valve 110 towards the pressure side. The cross symbols shown in each case indicate that a greater pressure prevails relative to other locations of the fluid pump 70. In FIG. 16, the flexible sealing arrangement 115 is stretched to a maximum extent.

Figure 17:
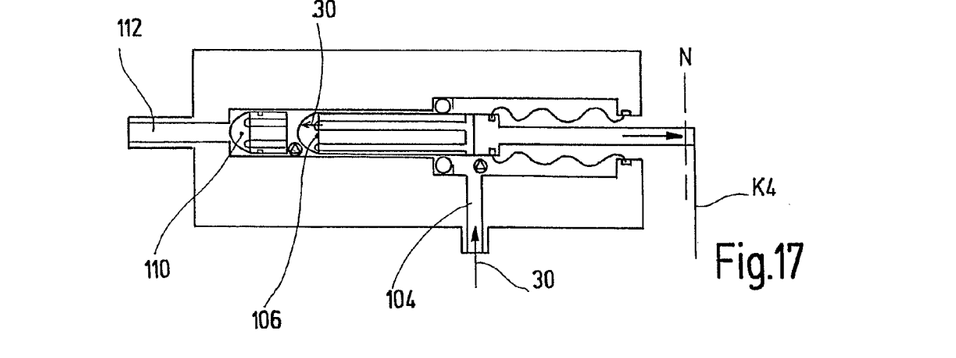
FIG. 17 shows a view comparable with FIG. 14 during a suction stroke.

FIG. 17 shows the fluid pump 70 during a subsequent suction stroke. In this connection, the piston 70 is moved back in the axial direction (piston position K4). At the same time, the second check valve 110 closes and in the pressure chamber 108 a vacuum is produced (shown by a triangular symbol). As a result, the first check valve 106 opens and the corresponding vacuum also prevails at the suction connector 104, so that fluid 30 flows via the suction connector 104 and the longitudinal channels 92 into the pressure chamber 108, as is shown in FIG. 17 by the double arrows.

As a result, the pressure chamber 108 is filled again so that again the situation of FIG. 14 occurs and a new operating stroke may be initiated.

During the operating stroke and during the suction stroke, the volume of the compensating chamber 114 remains at least approximately constant, so that no substantial forces are exerted onto the flexible sealing arrangement 115.

Figure 18:
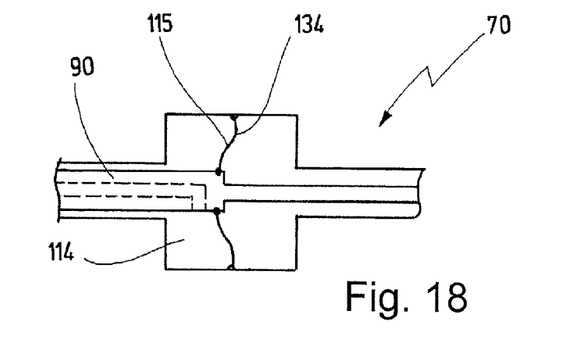
FIG. 18 shows a schematic view of an alternative sealing arrangement for a fluid pump according to the invention.

FIG. 18 shows an alternative embodiment of a flexible sealing arrangement 115, and namely in the form of a membrane portion 134, which extends from an outer circumference of the piston 90 towards an inner periphery of the compensating chamber 114.

In this embodiment, the volume of the compensating chamber 114 alters with movements of the piston 90. As a result, the compensating chamber 114 acts as a pump chamber. The membrane portion 134 is able to be designed in a corresponding manner. Preferably, this embodiment is used when using gaseous fluids.

Figure 19:
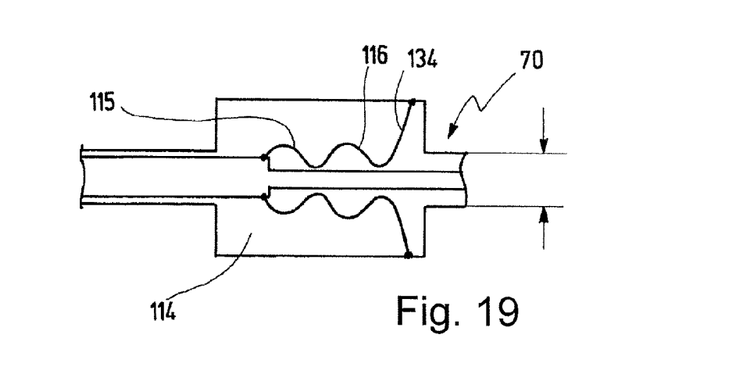
FIG. 19 shows a schematic view of a further alternative sealing arrangement for a fluid pump according to the invention.

FIG. 19 shows a further alternative embodiment of a sealing arrangement 115 which has a bellows portion 116 and a membrane portion 134.

In this embodiment the use of gaseous or liquid fluids is conceivable. When high pressure is produced on the membrane portion 134 said membrane portion may be applied to an inner face of the compensating chamber 114 (for example on the inside of the cover 78 on the suction side). The loading of the membrane portion may, as a result, be limited.

As a result, a specific pump action may take place via the compensating chamber 114, without excessively stressing the sealing arrangement 115.

Figure 20:
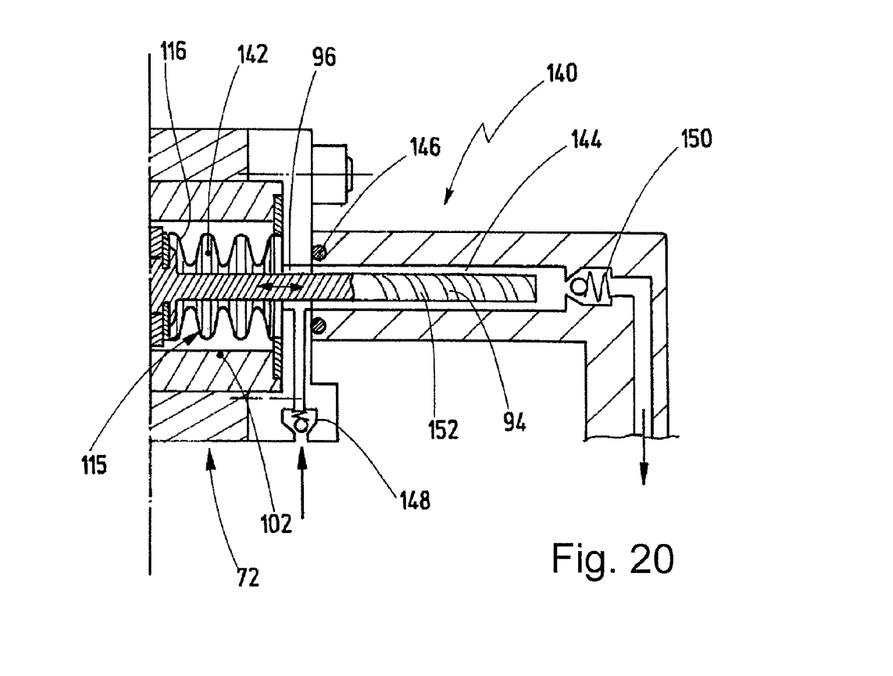
FIG. 20 shows a schematic view of an air pump arrangement attached on the suction-side end of the fluid pump of FIG. 10 for air suspension of a piston rod portion.

FIG. 20 shows an air pump arrangement 140 attached to the axial rear end of the fluid pump 70 on the suction side.

The air pump arrangement 140 is connected to an air chamber 142 of the flexible sealing arrangement 115, i.e. a chamber in the inside of the bellows portion 116. The air pump connection 140 contains an air bearing channel 144 which at least surrounds a portion of the piston rod protruding from the pump housing 72, and is designed to bear said piston rod portion by means of air. For reasons of clarity, an actuating mechanism for actuating the piston rod 94 is not shown.

The air bearing channel 144 is sealed via a seal 146 relative to the outside of the pump housing 72.

Moreover, the air pump arrangement 140 preferably has a first check valve 148 which is associated with a suction side of the air bearing channel 144 and a second check valve 150 which is associated with a pressure side of the air bearing channel 144.

The first check valve 148 may, for example, be integrated in the pump housing 72, and a suction connector connected to the opening 96. The second check valve 150 may be connected at one outlet end of the air bearing channel 144 as well as to an outlet opening.

With movements of the piston, the volume of the air chamber 142 is altered. As a result, the pressure in the inside of the air bearing channel 144 is also altered, which leads to the fact that, in one stroke, air is suctioned in via the first check valve 148 and, in an opposing stroke, air is ejected via the second check valve 150.

In order to achieve that the air (or another gas) entering the air bearing channel 144 completely surrounds the portion of the piston rod 94, an air supply groove 192 may be provided on the outer circumference of the portion of the piston rod 94, said air guide groove being configured, for example, in the manner of a rifled gun barrel.

The invention claimed is:

1. A check valve for arranging between a first pressure chamber, in which a first pressure of a fluid prevails, and a second pressure chamber in which a second pressure prevails, comprising a valve housing on which a valve seat is formed, and comprising a blocking element which is designed in a blocking position to close a valve opening in the region of the valve seat, in order to block a connection between the first and the second valve chambers, when the second pressure is greater than the first pressure, and is designed in an open position to release the valve opening in order to release the connection between the first and the second valve chambers when the first pressure is greater than the second pressure, the fluid being able to flow in the open position in a flow direction from the first pressure chamber into the second pressure chamber,     wherein the valve seat is configured as an oblique surface, which is aligned relative to the flow direction at an angle which is greater than 15° and less than 80°, the blocking element comprising a planar blocking lobe made from an elastically deformable material which in the blocking position bears against the oblique surface, and in the open position, due to the difference between the first pressure and the second pressure, lifts away from the oblique surface in order to release the connection, wherein the blocking element has an annular fastening portion, by means of which the blocking element is fastened to the valve housing, wherein the valve housing has an annular fastening recess, which is aligned transversely to the flow direction, the fastening portion being inserted into the fastening recess in order to secure the blocking element in the flow direction positively to the valve housing, and wherein the annular fastening portion comprising an annular portion, which is inserted into an annular fastening recess of the valve housing.

2. The check valve as claimed in claim 1, wherein the angle is greater than 30°.

3. The check valve as claimed in claim 1, wherein the angle is less than 60°.

4. The check valve as claimed in claim 1, wherein the blocking element is secured at a rear region of the oblique surface viewed in the flow direction to the valve housing.

5. The check valve as claimed in claim 1, wherein the valve seat has two oblique surfaces, which are inclined in opposing directions and in longitudinal section form a V-shape, a blocking lobe being associated with each oblique surface.

6. The check valve as claimed in claim 5, wherein the two blocking lobes are integrally connected together.

7. The check valve as claimed in claim 1, wherein the annular portion is connected to the blocking lobe via at least one longitudinal web portion.

8. The check valve as claimed in claim 7, wherein the longitudinal web portion is arranged in a longitudinally aligned recess of the valve housing.

9. The check valve as claimed in claim 1, wherein two blocking lobes are connected together in a transverse web, the ends thereof in each case being connected to the annular portion via a longitudinal web portion.

10. The check valve as claimed in claim 1, wherein the valve housing has a cylindrical portion, which has at least one longitudinal channel connected to the valve opening, the valve seat being configured on a front face of the cylindrical portion viewed in the flow direction.

11. A check valve for arranging between a first pressure chamber, in which a first pressure of a fluid prevails, and a second pressure chamber in which a second pressure prevails, comprising a valve housing on which a valve seat is formed, and comprising a blocking element which is designed in a blocking position to close a valve opening in the region of the valve seat, in order to block a connection between the first and the second valve chambers, and is designed in an open position to release the valve opening in order to release the connection between the first and the second valve chambers,     wherein the valve seat is configured as an oblique surface, the blocking element comprising an integral blocking lobe which in the blocking position bears against the oblique surface, and in the open position lifts away from the oblique surface in order to release the connection, wherein the blocking element has an integral fastening portion, by means of which the blocking element is fastened to the valve housing, and wherein the fastening portion comprising an annular portion, which is inserted into an annular fastening recess of the valve housing.

12. The check valve as claimed in claim 11, wherein the annular fastening recess is aligned transversely to the flow direction, the annular portion being inserted into the annular fastening recess in order to secure the blocking element in the flow direction positively to the valve housing.

13. The check valve as claimed in claim 11, wherein the annular portion is connected to the blocking lobe via at least one longitudinal web portion.

14. The check valve as claimed in claim 13, wherein the longitudinal web portion is arranged in a longitudinally aligned recess of the valve housing.

15. The check valve as claimed in claim 11, wherein two blocking lobes are connected together in a transverse web, the ends thereof in each case being connected to the annular portion via a longitudinal web portion.

\* \* \* \* \*